United States Patent Office 2,984,360
Patented May 16, 1961

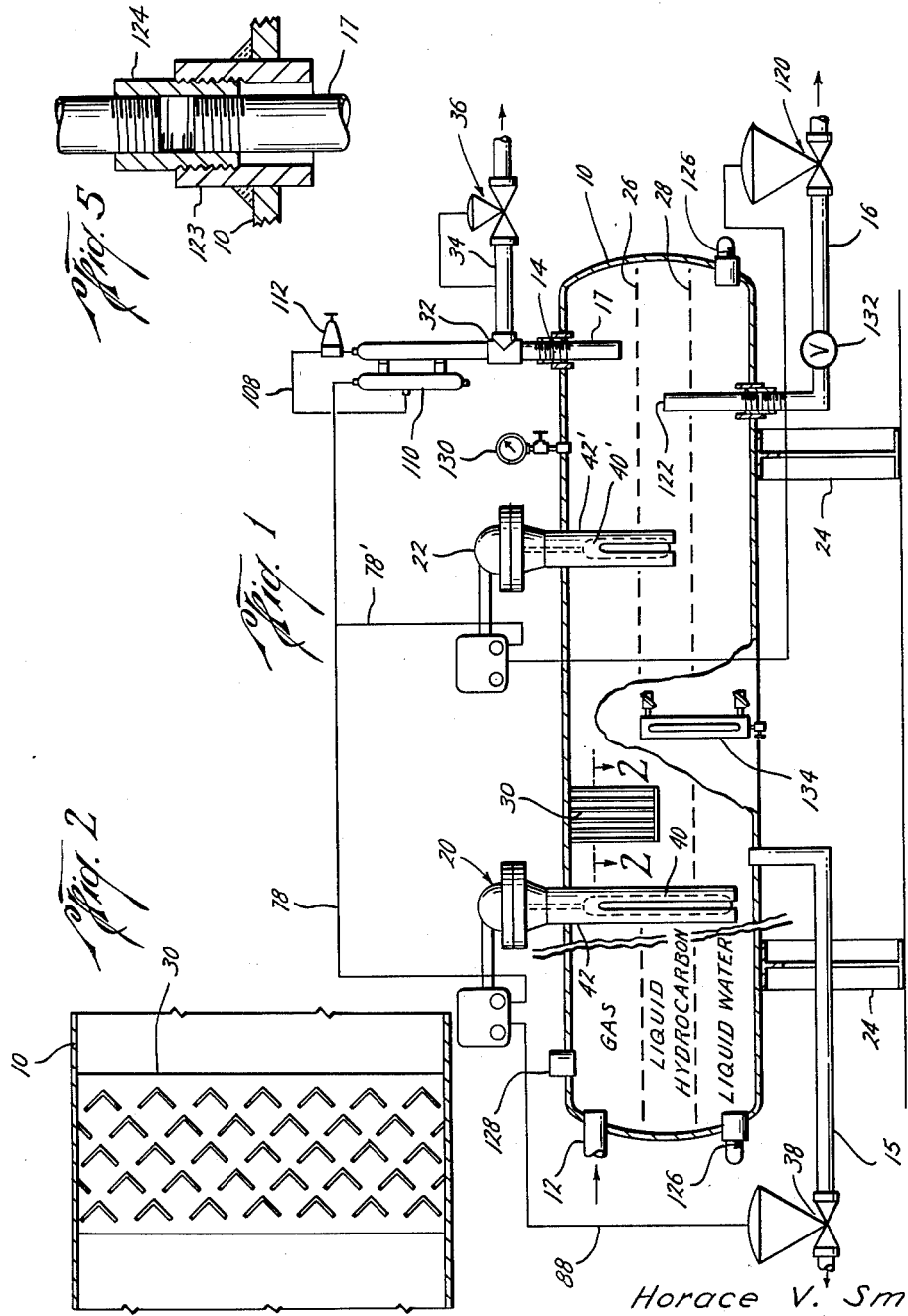

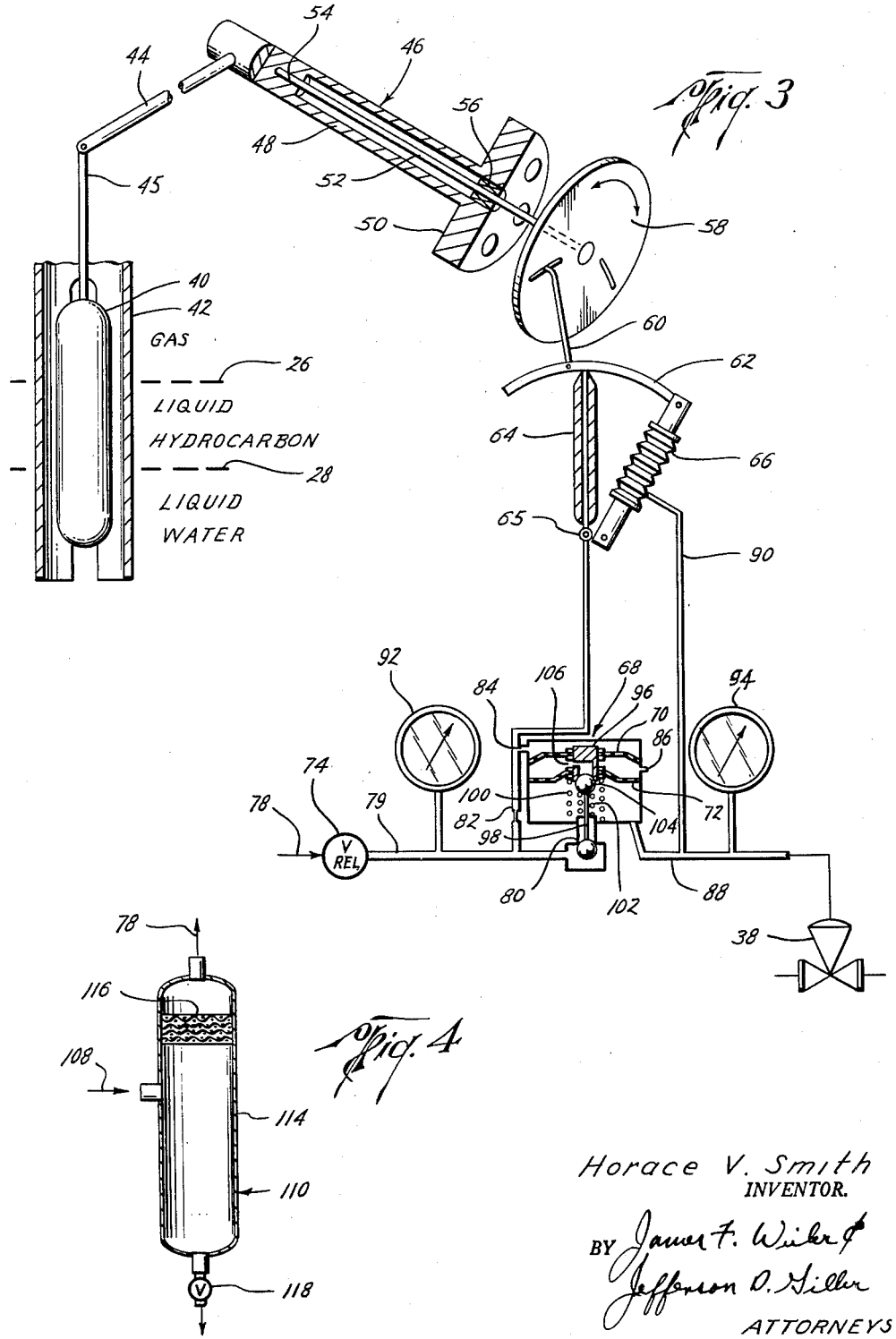

2,984,360

MULTIPURPOSE SEPARATOR

Horace V. Smith, Houston, Tex., assignor to Oil Metering and Processing Equipment Corp., Houston, Tex., a corporation of Texas Filed Mar. 25, 1957, Ser. No. 648,411

7 Claims. (Cl. 210—104)

This invention relates to separators for use in separating fluids of different density and specifically fluids from oil wells.

Oil wells normally produce a mixture of water, liquid hydrocarbons and gas. Commonly the flow lines from such producing oil wells pass this mixture through a separator separating the gas and liquid hydrocarbons from the liquid water or the gas from the liquids.

It is the general purpose of the present invention to provide a multipurpose fluid separator which may be used to separate the liquids from the gas, the heavier liquids such as water from the gas and lighter liquid such as liquid hydorcarbons, or to separate the heavier liquid from the lighter liquid and the lighter liquid from the gas.

As the use normally made of the apparatus of the present invention is in connection with oil wells the heavier liquid is water and the lighter liquid is liquid hydrocarbons and these liquids will be referred to herein as liquid hydrocarbons and water although it is to be understood that other liquids of different density may be separated by the present invention.

In such separation three layers are formed because of the different densities of the fluids with gas forming the top layer, liquid hydrocarbons the intermediate layer, and water the lowest layer.

It is a further object of the present invention to provide a separator having a sensitive liquid hydrocarbon-water interface level control by the use of a buoyancy mass extending from above the gas-liquid hydrocarbon interface downwardly through the liquid hydrocarbon-water interface into the water.

Still another object of the present invention is to provide a fluid separator which can easily accommodate the various water, liquid hydrocarbon, and gas percentage characteristics of oil wells by varying the fluid levels in the separator.

Still another object of the present invention is to provide such a separator which is economical to construct, dependable in use, and simple to maintain and which can be changed in the field from one type of service to another type of service.

Other and further objects, features, and advantages will be apparent from the following description of the preferred example of the invention, given for the purpose of disclosure and taken in conjunction with the accompanying drawings, where like character references designate like parts throughout the several views, and where;

Figure 1 is a partially diagrammatic longitudinal sectional view of the multipurpose separator of the present invention, Figure 2 is an enlarged view along the line 2—2 of Figure 1, Figure 3 is a partially diagrammatic and partially sectional view illustrating the buoyancy mass utilized in controlling the liquid levels and the valve actuating mechanism used in connection therewith, Figure 4 is an enlarged view of the "drip pot" in the pressure line to the valve actuating mechanisms, and Figure 5 is an enlarged fragmentary sectional view of the upper portion of the syphon tube.

Referring now to the drawings, and particularly Figure 1, the multipurpose separator as a whole includes the cylindrical elongate separator chamber 10 having a fluid inlet 12 at one end, a fluid outlet 14 opening into the other end, a water outlet line 15 extending from the bottom of the separator chamber 10, and a liquid hydrocarbon outlet line 16 providing a passage to the exterior from a point between the vertical levels of the fluid outlet 14 and the water outlet line 15. A first valve control mechanism 20 controls the level of the liquids and a second valve control mechanism 22 controls the level of the gas-liquid hydrocarbon interface.

The separator chamber 10 is supported in horizontal position such as by steel supporting saddles 24. From the flow line of a producing well, fluid containing gas, liquid hydrocarbons, and water enters the left end of the separator chamber 10 at the fluid inlet 12 separating by gravity into a top layer of gas, an intermediate layer of liquid hydrocarbons, and a lower layer of water forming a gas-liquid hydrocarbon interface 26 and a liquid hydrocarbon-water interface 28. The gas entering the fluid inlet 12 leaves the separator chamber 10 through the fluid outlet 14 at the opposite end of the separator chamber 10 from the fluid inlet 12 and in so doing passes through a gas scrubbing element 30 (Figures 1 and 2) set transversely of the separator chamber 10 across the entire path of the gas flow from the left to the right end of the separator chamber 10. This gas scrubbing element 30 may be of any conventional type such as the vane type best illustrated in Figure 2 and as located removes the liquid mist from the gas before the gas reaches the fluid outlet 14 causing the liquid mist to fall into the liquid layers.

Gas leaving the fluid outlet 14 moves through a T connection 32 in a fluid outlet line 34 against a back pressure valve 36 here shown diagrammatically as a diaphragm motor valve although other types may be used or against back pressure of other devices not shown so that pressure above atmospheric is maintained in the separator chamber 10.

The amount of liquid water in the separator chamber 10 is controlled by the water outlet valve 38 in the water outlet line 15, the first valve control mechanism 20 and the general elongate buoyancy mass 40 (Figure 3). The buoyancy mass 40 is movable slightly with changes of liquid level in the separator chamber 10 causing the first valve control mechanism 20 to open and close the water outlet valve 38 at the desired liquid levels.

Referring now to Figure 3, the elongate buoyancy mass 40 is mounted in a slotted housing 42 with the buoyancy mass 40 projecting into both the gas and water levels and completely through the liquid hydrocarbon level for a reason which will be made apparent later herein. The buoyancy mass 40 is pivotally connected to a crank arm 44 by the rigid arm 45, the crank arm 44 being rigidly connected to the torsion tube assembly generally designated by the reference numeral 46 of the valve control mechanism 20.

The torsion tube assembly 46 includes a torsion tube 48 to which the crank arm 44 is rigidly connected, which torsion tube 48 is also rigidly connected to a stationary flange 50 so that the torison tube may be torqued due to the movement of the buoyancy mass 40. A rod 52 is disposed within the torsion tube 48 and rigidly secured to the head of the torsion tube 48, as at 54, but rotatably extends through the flange 50 and the bearing 56 to the disc 58.

A hanger 60 is connected to the rotatable disc 58 and to what might be termed a curved piece 62 which rests upon the upper end of the nozzle 64 and which is pivotally secured at one end to the bellows assembly 66. Thus, rotation of the rod 52 in a clockwise direction causes a corresponding rotation of the disc 58 and an elevation of the curved piece 62 thereby opening the upper end of the nozzle 64, whereas, rotation of the rod 52 in a counter-clockwise direction causes a corresponding rotation of the disc 58 and a lowering of the curved piece 62 to bring it to the position illustrated in Figure 3 for closing the upper end of the nozzle 64 thereby preventing pressure from bleeding through this upper end.

A pressure control pilot valve indicated generally by the numeral 68 is also provided as a part of the valve control mechanism 20 which pilot valve 68 includes a pair of diaphragms 70 and 72 to which a regulated supply of gas is provided from the upper portion of the separator chamber 10 through the pressure regulator valve 74 and the line 79 through the pilot valve 80 to the under side of the diaphragm 72 and through the leg 82 to the nozzle 64 and through the connected leg 84 to the upper side of the upper diaphragm 70. A bleed port 86 is provided to bleed fluid pressure from the space between the diaphragms 70 and 72. Pressure is supplied from below the control diaphragm 72 and into the pressure line 88 and from the bellows 66 into the pressure line 90 joining the pressure line 88 which is connected to the water outlet valve 38 which is a pressure responsive motor diaphragm valve.

The supply gauge 92 is connected to the pressure inflow line 78 and an output gauge 94 is connected to the pressure outflow line 88.

The operation of the valve control mechanism 20 is as follows: As buoyancy on the buoyancy mass 40 is changed in response to changes of liquid level in the separator chamber 10, it causes the torsion tube 48 to be torqued in one direction or the other which causes a corresponding rotation of the rod 52. This in turn causes a rotation of the disc 58 causing the curved piece 62 to be lifted away from the upper end of the nozzle 64 or seated thereon. When the curved piece 62 seats on the upper end of the nozzle 64, as illustrated, and cuts off escape of gas through this nozzle 64, a pressure increase occurs on the upper side of the diaphragm 70 which because it is rigidly connected to the diaphragm 72 by a spacer 96 causes both diaphragms to move downwardly and push the double ended valve assembly 98 down opening the pilot valve 80. This permits gas under pressure in the line 79 to flow into the space below diaphragm 72 and into the line 88 to the water outlet valve 38 actuating this valve 38. The pilot valve 80 remains open only until the force on the lower diaphragm 72 area reaches an equilibrium with the loading pressure on the upper diaphragm 70 area. When this happens the coil spring 100 pushes both diaphragms 70 and 72 upwardly causing the pilot valve to close through the action of spring 102.

When change of buoyancy on the buoyancy mass 40 causes the curved piece 62 to uncover the upper end of the nozzle 64 the pressure in the pressure control pilot 68 above the diaphragm 70 is relieved and the greater pressure momentarily existing below the diaphragm 72 causes diaphragms 70 and 72 to move upwardly opening valve 104 in the pressure control pilot 68. This allows gas under pressure to pass from below the diaphragm 72 through the port 106 into the space between the diaphragms 70 and 72 and out the bleeder port 86. Equilibrium will again cause the pilot valve 80 to close.

Such operation causes an "on-off" pressure to be supplied to and actuate the water outlet valve 38 which is a motor diaphragm valve.

In use the valve control mechanism 20 is calibrated by rotating the nozzle 64 about its pivot 65 and by adjusting the nozzle 64 with a micrometer screw not shown.

No more detailed description is deemed necessary of the particular valve control mechanism 20 illustrated in Figure 3 as all of it and the buoyancy mass 40 are a commercial assembly readily available on the market manufactured by Black, Sivalls and Bryson, Inc., of Tulsa, Okla., and is known as Climax Control Type 887 with 1450 pilot. Other satisfactory units are available from Fisher Governor Co., Mason-Neilan Co., and others.

The water outlet valve 38 in this example of the invention may be any preferred type of double acting pressure responsive valve such as a Kimray Model 2100–SMT manufactured by Kimray, Inc., Oklahoma City, Oklahoma, or diaphragm control valve types 657 and 657R manufactured by Fisher Governor Company, Marshalltown, Iowa and as these valves are readily available upon the open market no further description of them is necessary or appropriate.

Gas pressure for line 78 to operate the valve control mechanism 20 and the water outlet valve 38 may be taken from any convenient place from the gas strata of the separator chamber 10. Preferably this line 78 is connected through a drip pot 110 and a high pressure reducing regulator 112 to the fluid outlet line 34 at the T connection 32. As the separator of the present invention often operates under pressures in the neighborhood of 4,000 p.s.i. this pressure normally needs to be reduced before it reaches the pressure regulator valve 74 of the valve control mechanism 20 and for this purpose an antifreeze high pressure reducing regulator such as type 1305 or 1306 manufactured by Fisher Governor Company, Marshalltown, Iowa may be used. These and other commerical units are readily available on the market and no further description of them is necessary.

To remove free liquid from this gas after its pressure has been reduced by the regulator 112, the gas from the regulator 112 passes through line 108 and enters the drip pot at approximately its midsection as best illustrated in Figure 4. Any conventional drip pot may be used such as the one here illustrated in which the relatively large cylindrical body 114 in relation to the line 108 reduces the velocity of the gas entering in from line 108. This reduced velocity in conjunction with the mist deflecting screen 116 across the top of the body 114 removes the free liquid and mist still remaining in the gas leaving the reducing regulator 112. A drain valve 118 at the lower end of the drip pot 110 permits periodic removal of captured liquids.

In most operations the buoyancy mass 40 in conjunction with the valve control mechanism 20 controls only the liquid hydrocarbon-water interface 28 and it is an important feature of this invention in such operations that the buoyancy mass 40 extends into the gas level, through the liquid hydrocarbon level, and into the lower part of the water containing portion of the separator chamber 10 in order to obtain increased sensitivity. This buoyancy mass 40 is movable with changing liquid levels in the separator chamber 10 but such movement is slight compared to the changes in liquid levels. As the liquid hydrocarbon-water interface 28 drops when water drains through the water outlet valve 38 the liquid hydrocarbon level follows this interface. Because there is little difference in density between the liquid hydrocarbon and water this lowering in level of the liquid hydrocarbon-water interface 28 does not greatly affect the buoyancy force on the buoyancy mass 40. However, because the upper portion of the buoyancy mass 40 extends into the gas strata, the downward movement of the gas-liquid hydrocarbon interface 26 exposes more of the buoyancy mass 40 to the gas strata which has considerably less density than the liquid hydrocarbons or water and thus the downward movement of the liquid hydrocarbon-water interface 28 changes the buoyancy on the buoyancy mass 40 considerably. Likewise, upward movement of the liquid hydrocarbon-water interface 28 decreases the gas exposed volume of the buoyancy mass 40 also changing the buoyancy force on the buoyancy mass 40 considerably.

If the buoyancy mass 40 were to extend into the liquid hydrocarbon and water levels only and not into the gas level there would be little change in buoyancy on the buoyancy mass 40 when the water level changed. Units operating with the buoyancy mass 40 located as shown in Figures 1 and 3 will control the water level to within 1/16 of an inch measured vertically as compared to approximately three inches where a buoyancy mass extends only to the two liquid levels. Such sensitivity by the arrangement illustrated in Figures 1 and 3 has several advantages including elimination of danger of the water outlet valve 38 being stuck in a closed or open position which sometimes occurs when a buoyancy mass is used which extends into the liquid levels only.

The second valve control mechanism 22 and its buoyancy mass 40' in conjunction with the liquid hydrocarbon outlet valve 120 may be in all respects identical to the first valve control mechanism 20 and the water outlet valve 38. However, the buoyancy mass 40' need only extend across the gas-liquid hydrocarbon interface 26.

An open end 122 of the liquid hydrocarbon outlet line 16 extends into the liquid hydrocarbon level and when the liquid hydrocarbon outlet valve 120 is in operation the gas-liquid hydrocarbon interface 26 does not fall far enough to reach this open end 122 nor does the liquid hydrocarbon-water interface 28 rise far enough to reach this open end 122 so that only liquid hydrocarbons may pass through the liquid hydrocarbon outlet line 16. Further, when the liquid hydrocarbon outlet valve 120 is in operation the gas-liquid hydrocarbon interface 26 does not rise to the fluid outlet 14 so that only gas passes through the fluid outlet 14 in such instances.

The tube or nipple 17 projecting into the upper portion of the separator chamber 10 from the fluid outlet 14 is preferably used only when the multipurpose separator of the present invention is being operated to separate gas and liquid hydrocarbon from water in which instance the gas and liquid hydrocarbons flow out through this nipple 17. A structure showing an arrangement for ease of insertion and removal of the nipple 17 and insertion and removal of different lengths of nipples 17 for varying liquid and gas percentage characteristics is best shown in Figure 5. An internally threaded large coupling 123 such as a three-inch coupling is secured to and through the chamber 10 such as by welding. A smaller coupling 124 having external threads thereon complementary to the internal threads of the larger coupling 123 is threadedly secured in the larger coupling 123. This smaller coupling 124 such as a two-inch coupling, is internally threaded at both ends so that the upper end of the nipple 17 may be threadedly secured in the lower end of this smaller coupling 124 and the lower end of the fluid outlet line 34 may be threaded into the upper end of the smaller coupling 124. Thus by removal of the smaller coupling 124 from the larger coupling 123 nipples 17 of various lengths may be inserted into the separator chamber 10 or may be removed completely therefrom.

This same type of structure illustrated in Figure 5 may be used at the point of entrance of the liquid hydrocarbon outlet line 16 into the separator chamber 10 (Figure 1) for removal or change in length of the portion of this liquid hydrocarbon line 16 within the separator chamber 10.

Normally drain and washout connections (Figure 1) 126 are provided in the lower portion of each end of the separator chamber 10 for cleaning and a relief valve, not shown, is connected to the relief valve connection 128 such as is shown near the fluid inlet 12. Also a pressure gauge 130 may be provided in the upper portion and a sight 134 in the side of the separator chamber 10.

In operation, if the multipurpose separator of the present invention is used to separate the gas and liquid hydrocarbons from the water, which use is commonly referred to as a "free water knockout," the liquid hydrocarbon outlet valve 120 is taken out of service such as by closing a hand valve 132 in liquid hydrocarbon outlet line 16, or this outlet line 16, the second valve control mechanism 22, and the buoyancy mass 40' may be completely removed from the separator chamber 10. The valve control mechanism 20 is adjusted so that it controls the liquid hydrocarbon-water interface 28. This adjustment may be made by controls on the commercially available valve control mechanisms 20 described herein and no detailed description of such controls is necessary. A nipple 17 of desired length is connected to the fluid outlet line 34 and extended downwardly into the separator chamber 10 the desired distance. Well fluid containing gas, liquid hydrocarbons, and water enters the fluid inlet 12 and separates into three levels due to the differences in density. When the pressure in the separator chamber 10 is sufficient to overcome back pressure valve 36 or the pressure in any other vessel to which the fluid outlet line 34 is connected gas will flow out the nipple 17. The water outlet valve 38 is closed and as water level rises the liquid hydrocarbon level will also rise. When the gas-liquid hydrocarbon interface 26 reaches the lower end of the nipple 17 the pressure of the gas on the liquid hydrocarbons will force the liquid hydrocarbons out the nipple 17 and maintain the gas-liquid hydrocarbon interface 26 at approximately the lower end of the nipple 17. The liquid hydrocarbon-water interface 28 continues to rise until it reaches a predetermined and calibrated level below the lower end of the nipple 17 whereupon upward movement and force of the buoyancy mass 40 operates the valve control mechanism 20 opening the water outlet valve 38 draining the liquid water due to gravity and pressure of the gas in the separator chamber 10. When the liquid hydrocarbon-water interface 28 falls to a predetermined and calibrated low level downward movement and weight of the buoyancy mass 40 will again influence the valve control mechanism 20 closing the water outlet valve 38 whereupon the water level will again begin to rise repeating the cycle.

If it is desired to use the multipurpose separator of the present invention to separate the gas from all of the liquids, the arrangement is changed from that when used as a "free water knockout" by removing the nipple 17 as it is no longer necessary and by adjusting the valve control mechanism 20 so that it controls the gas-liquid hydrocarbon interface 26 only. When adjusted to separate the gas from the liquids, the gas in the separator chamber 10 will continually flow out the fluid outlet 14. The water outlet valve 38 is closed and as well fluids enter the fluid inlet 12 the two liquid levels will rise until the gas-liquid hydrocarbon interface 26 reaches a predetermined and calibrated level below the fluid outlet 14. When this occurs the buoyancy mass 40 will influence the valve control mechanism 20 causing the water outlet valve 38 to open whereupon the water and then the liquid hydrocarbons will drain out the water outlet valve 38 until the gas-liquid hydrocarbon interface 26 reaches a predetermined and calibrated low level whereupon the buoyancy mass 40 will again influence the valve control mechanism 20 and close the water outlet valve 38 causing the two liquid levels to again rise thereby repeating the cycle.

When the multipurpose separator of the present invention is used to separate the gas, the liquid hydrocarbons, and liquid water from each other the nipple 17 is also removed. When used in such manner the liquid hydrocarbon outlet line 16 and outlet valve 120, the second valve control mechanism 22, and the second buoyancy mass 40' are utilized such as by opening the valve 132 in the liquid hydrocarbon outlet line 16. The first valve control mechanism 20 is set to control the liquid hydrocarbon-water interface 28 and the second valve control mechanism is set to control the gas-liquid hydrocarbon interface 26. Gas in the separator chamber 10 will continually flow out the fluid outlet 14. The liquid hydrocarbon-water interface 28 never rises to the opening 122 in the liquid hydrocarbon outlet line 16 and the gas-liquid hydrocarbon interface 26 never falls to this same opening so that only liquid hydrocarbons will drain through the liquid hydrocarbon outlet 16. Also, the gas-liquid hydrocarbon interface 26 does not rise to such a close proximity to the fluid outlet 14 that any liquid hydrocarbons will pass out there with the gas.

When used to separate gas, liquid hydrocarbons and liquid water from each other, the buoyancy mass 40, the first valve control mechanism 20 and the water outlet valve 38 are set to control the liquid hydrocarbon-water interface 28 so that this particular interface 28 fluctuates between predetermined and calibrated levels slightly below the opening 122 in the liquid hydrocarbon outlet line 16 and a desired low level in the separator chamber 10. The buoyancy mass 40', the second valve control mechanism 22, and the liquid hydrocarbon outlet valve 120 control the gas-liquid carbon interface 26 so that it never falls below the opening 122 nor rises to the fluid outlet 14, that is, as the liquid hydrocarbon level falls with drainage of the liquid water the buoyancy mass 40' and second valve control mechanism 22 will close the then open liquid hydrocarbon outlet valve 120 when the gas-liquid hydrocarbon interface 26 approaches the opening 122. This liquid hydrocarbon valve 120 will remain closed until the gas-liquid hydrocarbon interface 26 rises to the desired level below the fluid outlet 14 whereupon the buoyancy mass 40' and second valve control mechanism 22 will open the liquid hydrocarbon outlet valve 120.

While the present invention has been described in connection with separating gas, liquid hydrocarbons, and liquid water, it will be understood that the invention may be used for separating other liquids and gases.

The present invention, therefore, is well suited to carry out the objects and attain the advantages and ends mentioned as well as others inherent therein. Accordingly, the invention is to be limited only by the spirit thereof and the scope of the appended claims.

What is claimed is:

1. A separator comprising, a separator chamber, a fluid inlet for introducing a mixture of gas, a light liquid, and a heavy liquid into the chamber said gas and liquid forming a gas-light liquid interface and a light liquid-heavy liquid interface, a fluid outlet in an upper portion of the chamber spaced from the fluid inlet, a heavy liquid outlet line from a lower portion of the chamber, a first valve in the heavy liquid outlet line, a light liquid outlet line from a point in the chamber vertically spaced between the fluid outlet and the heavy liquid outlet line, a second valve in the light liquid outlet line, a movable buoyancy mass in the chamber said movable buoyancy mass having a length sufficient to extend through both said interfaces and positioned in said chamber to extend through both said interfaces, a first valve control mechanism connected to said buoyancy mass and actuated by change of buoyancy on the buoyancy mass, said first valve control mechanism associated with the first valve for closing said first valve when the light liquid-heavy liquid interface reaches a predetermined low level and opening said first valve when the light liquid-heavy liquid interface reaches a predetermined high level below the light liquid outlet line whereby the heavy liquid drains out the heavy liquid outlet line, movable means in the chamber movable by changing level of the gas-light liquid interface, a second valve control mechanism actuated by said movable means and associated with the second valve for closing said second valve when the gas-light liquid interface reaches a predetermined low level above the light liquid outlet line and opening the second valve when the gas-light liquid interface reaches a predetermined high level below the fluid outlet whereby light liquid drains out the light liquid outlet line and the gas passes out the fluid outlet.

2. The combination of claim 1 in which the buoyancy mass has a negative buoyancy in the heavy liquid.

3. The combination of claim 1 in which the buoyancy mass is elongate and is positioned in the chamber with its longer axis vertical.

4. A separator comprising, a separator chamber, a fluid inlet for introducing a mixture of gas, a light liquid, and a heavy liquid into the chamber said gas and liquids forming a gas-light liquid interface and a light liquid-heavy liquid interface, a fluid outlet in an upper portion of the chamber spaced from the fluid inlet, a tube in fluid communication with said fluid outlet and depending therefrom into an upper portion of the chamber, a heavy liquid outlet line from a lower portion of the chamber, a valve in the heavy liquid outlet line, a movable buoyancy mass in the chamber, said movable buoyancy mass having a length sufficient to extend through both said interfaces and positioned in said chamber to extend through both said interfaces, a valve control mechanism connected to said buoyancy mass and actuated by change of buoyancy on said buoyancy mass, said valve control mechanism associated with the valve for closing said valve when the light liquid-heavy liquid interface reaches a predetermined low level and opening said valve when the light liquid-heavy liquid interface reaches a predetermined high level below the tube whereby the heavy liquid drains out the heavy liquid outlet line and the gas and the light liquid pass out the tube.

5. The combination of claim 4 in which the buoyancy mass has a negative buoyancy in the heavy liquid.

6. In a separator adapted to separate a heavy liquid from a light liquid, said separator having a chamber containing layers of gas, light liquid, and heavy liquid forming a gas-light liquid interface and a light liquid-heavy liquid interface, a fluid outlet in an upper portion of the chamber, a liquid outlet line from a lower portion of the chamber, and a valve in the liquid outlet line, the improvement comprising a movable buoyancy mass in the chamber said movable buoyancy mass having a length sufficient to extend through both said interfaces and positioned in said chamber to extend through both said interfaces, a valve control mechanism connected to said buoyancy mass and actuated by change of buoyancy on said buoyancy mass, said valve control mechanism associated with said valve for closing said valve when the light liquid-heavy liquid interface reaches a predetermined low level and opening said valve when the light liquid-heavy liquid interface reaches a predetermined high level.

7. The combination of claim 6 in which the movable buoyancy mass has a negative buoyancy in the heavy liquid.

References Cited in the file of this patent

UNITED STATES PATENTS

| 1,094,861 | Murphy | Apr. 28, 1914 |
| 2,061,517 | Kenny | Nov. 17, 1936 |
| 2,170,247 | Lambert | Aug. 22, 1939 |
| 2,179,131 | Millard | Nov. 7, 1939 |
| 2,664,170 | Walker | Dec. 29, 1953 |

FOREIGN PATENTS

| 137,835 | Australia | Oct. 30, 1947 |
| 306,366 | Switzerland | Apr. 15, 1955 |